United States Patent Office 3,776,981
Patented Dec. 4, 1973

3,776,981
HYDROFORMYLATED BLOCK COPOLYMERS
Hans J. S. Winkler, Berkeley, and Friedrich E. Neumann, Oakland, Calif., assignors to Shell Oil Company, Houston, Tex.
No Drawing. Filed Feb. 3, 1971, Ser. No. 112,463
Int. Cl. C08f 19/08, 27/00, 27/24
U.S. Cl. 260—880 B 16 Claims

ABSTRACT OF THE DISCLOSURE

Novel hydroxylated block copolymers are made by reacting a precursor block copolymer with carbon monoxide and hydrogen. The precursor block copolymer has at least one mono alpha alkenyl arene polymer block and at least one conjugated diene polymer block having between 0% and about 30%, 1,2 or 3,4 microstructure, the balance being 1,4 structure. Alternatively, the 1,2 or 3,4 microstructure of the precursor polymer may be decreased or substantially removed by selective hydrogenation before hydroformylation. Hydroformylation of the block copolymer with about 1:1 to about 5:1 hydrogencarbon monoxide mixture using a complex cobalt carbonyl trihydrocarbylphosphine catalyst produces mainly —$CH_2OH$ substituents. In the hydroxylated polymers so produced, 10–100% of the olefinic unsaturation in the diene polymer block has been replaced with —$CH_2OH$ groups and 90% to 0% of the unsaturation has been saturated with hydrogen.

BACKGROUND OF THE INVENTION

The present invention relates to novel hydroxylated derivatives of block copolymers and to a method for preparing them by reacting the block copolymers with carbon monoxide and hydrogen in the presence of a special transition metal complex.

Production of hydroxyl and carbonyl compounds by reacting olefins with carbon monoxide and hydrogen has been known for many years. The products contain, as a rule, one more carbon atom than the reacting olefin, although some homologation to produce molecules that have two or three more carbon atoms than the olefins also occurs. The reaction requires a hydrocarbon-soluble catalyst, usually one containing cobalt, iron, nickel or rhodium atoms, i.e., metals selected from Group VIII of the Periodic Chart, in complex bond with at least one ligand consisting of a carbon monoxide molecule and often a second ligand containing an organic compound of an atom, such as phosphorus or arsenic, selected from Group V-A of the Periodic Chart.

In the so-called oxo reaction, simple olefins are converted rapidly to aldehydes using carbon monoxide, hydrogen, and cobalt octacarbonyl catalyst in yields as high as 90%; later hydrogenation converts the aldehydes to the familiar oxo alcohols of commerce. Undesirable by-products are formed by polymerization of the simple aldehydes to trimeric compounds and to linear polymers, by aldol condensation and by reaction to form ketones, but these by-products usually amount to only about 10% w. of the total reaction product. Selectivity to produce alcohols is good.

Various homopolydienes and random diene copolymers have been treated with carbon monoxide and hydrogen under these oxo conditions, mainly to produce products that had multiple aldehyde groups. The products, unlike simple aldehydes, were unstable and often cross-linked readily to form insoluble gels. Films made by evaporation of solutions of these aldehydes were easily embrittled by ultraviolet light, and none of these polymers was thermoplastic.

Reaction of olefins and diene polymers with carbon monoxide and hydrogen using more complex catalysts, for example, the cobalt carbonyltrialkylphosphine type, yields polymers having many aldehyde groups and some alcohol groups distributed along the carbon backbone chain. The hydrogen to carbon monoxide ratio is usually about 2:1. Rates of reaction are faster and yield of carbonylation product may be increased by raising the hydrogen content of the gas phase relative to carbon monoxide to 3/1 or more. The aldehyde groups may be hydrogenated to alcohols, if desired, by raising the hydrogen content of the system relative to the carbon monoxide content still further and continuing reaction at slightly higher temperatures. The hydrocarbon monoxide ratio may be about 20:1 during hydrogenation and the same catalyst serves as hydrogenation catalyst. The product from the two-stage reaction is essentially a saturated polyalcohol and may no longer be a conventional vulcanizable system, i.e., typical high strength elastomeric articles may not be possible by vulcanization procedures because the product no longer has enough olefinic double bonds.

When elastomeric diene homopolymers are reacted in this way to form polyalcohols, the products are elastomeric, in the broad sense, if the extent of derivatization is limited. The oxygen content of the hydroformylated and reduced product is a measure of the average number of polar groups installed and represents mostly hydroxyl groups, since those are the predominant type of polar groups created in this two-stage reaction. A hydroformylated, synthetic polybutadiene is still elastomeric if hydroformylated to about 3.5% w. oxygen content, but when reaction is continued to about 8% oxygen, the product is fibrous and has very poor elasticity. Theory predicts, and the result above and other prior art tend to confirm, that polar groups restrict movement of segments of molecules and thereby reduce product elasticity. The favorable range for retention of elastomeric properties seems to be from about 1% to about 5% oxygen.

In the past few years a special class of copolymers has been developed that are generally referred to as block copolymers. More specifically, a class of thermoplastic elastomers has been developed that has the general structure A—B(B—A)$_n$ wherein $n$ is a small integer of the order of 1 to 6. In these block copolymers the A polymer blocks are generally mono alpha alkenyl arene polymer blocks typified by polystyrene. The B block is a polymer block of a conjugated diene or an elastomeric copolymer block of random styrene-conjugated diene. A typical species of such block copolymers has the general structure polystyrene-polybutadiene-polystyrene.

These elastomeric block copolymers have unique properties, one of which is that they are "self-curing," i.e., they do not require chemical vulcanization, as do conventional elastomers, to achieve high strength and other commercially useful properties. Also, these polymers are thermoplastic, i.e., they can be heated, made to flow in conventional molding equipment and cooled to regain their high strength. Furthermore, heating, molding and cooling may be done repeatedly without loss of the desirable elastomeric and strength properties of these polymers.

The state of the art of forming block copolymers has advanced rapidly in the last few years. A number of block copolymer types have been proposed that may have two or more polymer blocks, or may be essentially linear or may be branched in at least part of the molecule. These polymers may be produced by a variety of processes, such as by sequential addition of the individual monomers to form individual polymer blocks or by a combination of sequential addition and coupling. When coupling is desired, the choice of the coupling agent has been found to be important in creating the desired structure, i.e., linear or multi-branched.

When a self-vulcanizing, elastomeric block copolymer is desired, a conjugated diene, such as butadiene, is often preferred as the monomer to form the predominant part of the middle polymer block. Hard, thermoplastic, non-elastomeric block copolymers are made by using as the predominant monomer a substance, such as styrene or alpha methyl styrene, normally capable of forming a thermoplastic resin when homopolymerized. By judicious selection among the factors noted above, especially the relative individual block molecular weights, the whole set of products from highly elastic to highly plastic types can be prepared. According to the prior art, a simple structure such as A—B—A, in which each A is a mono alpha alkenyl arene polymer block and B is a conjugated diene polymer block, will have elastomeric properties and be thermoplastic, if the A polymer blocks constitute less than about 50% of the entire weight of the polymer molecule.

Derivatives of these block polymers have been made by adding various chemical compounds to the double bonds. Hydrogen may be added to improve the oxidation stability and service temperatures of the polymers, or polar radicals may be installed to adjust solubility in various solvents, or permeability to water, or to confer special chemical reactivity or with other objectives. A number of reactions are known for this purpose, such as hydrohalogenation, carboxylation, epoxidation, and hydroxylation by hydrogenation of epoxide groups. The products show properties different from their parent block copolymers, depending on the kind of polar groups installed and especially on the location of the polar groups in one or the other of the blocks and the concentration of polar groups per molecule.

Improved resistance to non-polar solvents, better fire resistance, better weatherability and other types of environmental resistance, and capability for reaction with other molecules such as by salt formation, for example, are typical changes in properties that result. The set of properties may be achieved by choosing among various alternatives, including the chemical identity of the various polymer blocks, individual block molecular weights, weight ratio of the different species of blocks, total molecular weight and the factors mentioned above.

OBJECTS OF THE INVENTION

It is an object of the present invention to provide improved block copolymers. It is a particular object of this invention to provide hydroxylated block copolymers that have improved resistance to solvents and weathering. It is a further object of this invention to provide a process for preparing hydroxylated block copolymers. Other objects will become apparent during the following detailed description of the invention.

STATEMENT OF THE INVENTION

Now, in accordance with this invention, a hydroxylated block copolymer is provided comprising a block copolymer having, prior to reductive hydroformylation with carbon monoxide, and hydrogen, at least one mono alpha alkenyl arene polymer block and at least one conjugated diene polymer block wherein the 1,2 or 3,4 microstructure is between 0% and about 30%, the balance of the polydiene block being 1,4 structured, said copolymer being reacted with hydrogen and carbon monoxide until 10% to 100% of the unsaturation in the diene polymer block has been replaced with —CH$_2$OH groups and 90% to 0% of the unsaturation has been saturated with hydrogen.

Also in accordance with this invention, a method is provided for preparing a hydroxylated polymer comprising reacting a block copolymer having at least one mono alpha alkenyl arene polymer block and at least one conjugated diene polymer block wherein the 1,2 or 3,4 microstructure is between 0% and about 30%, the balance being 1,4 structured, with hydrogen and carbon monoxide in a molar ratio between about 1:1 and about 5:1 at a temperature of 150° C. to about 225° C. and at a pressure of about 150° to about 1500 p.s.i.g. for 1 to 10 hours in the presence of a catalyst consisting essentially of a transition metal selected from the group iron, nickel and cobalt in complex combination with carbon monoxide and a trihydrocarbylphosphine until 10–100% of the unsaturation in the diene polymer block has been replaced with —CH$_2$OH groups and 90% to 0% of the unsaturation has been saturated with hydrogen.

The hydroxylated polymers of this invention have mono alpha alkenyl arene polymers blocks that have not been attacked by carbon monoxide or hydrogen, and also have hydroxyl-substituted polymer blocks wherein a primary alcohol group (—CH$_2$OH) has been installed at the locale of many of the double bonds in the precursor diene polymer block. The aldehyde (—CH=O) groups formed initially by reaction of carbon monoxide and hydrogen with the olefinic double bonds in the block copolymer are hydrogenated in situ to hydroxymethyl groups (—CH$_2$OH)

or to a small extent homologs such as hydroxyethyl or hydroxypropyl groups, and residual olefinic double bonds not reacted with CO and H$_2$ are substantially converted in situ to saturated hydrocarbon structures.

The preparation of the precursor block copolymer (before reductive hydroformylation) may follow processes broadly known in the block polymer art. The precursor products, in general, will have a general formula of the group consising of A—B(A)$_{0-1}$,

A(B—A)$_{2-5}$ and A—B(B—A)$_{2-5}$. In this formula each A represents a mono alpha alkenyl arene block and each B is a polymer block formed from a conjugated diene. Where at any point two essentially identical B blocks are directly connected, except possibly for the residue of a coupling agent (not indicated in the general formula), the connected blocks are consisdered to be a single block for the purposes of describing molecular weights, responses to chemical addition reactions and the like. When the subscript is zero in the above formula, the two-block polymer A—B is meant. When the subscript is 1, the A—B—A structure of linear form is intended. Branched structures are designated when the subscript is between 2 and 5; for example, where a tetrafunctional coupling agent is used, the structure would be represented by

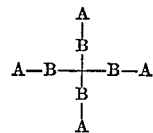

It will be understood that these general formulas have been written to include either sequentially formed species or species that have been formed, at least in part, by the use of coupling agents. In the latter instance, any residue of the coupling agents has been ignored as an insignificant part of the general formula for high molecular weight polymers.

Typical mono alpha alkenyl arene polymer blocks A are prepared from styrene, alpha methyl styrene, ring alkylated styrenes, vinyl naphthalene, vinyl pyridine and the like, or mixtures of them. They may be modified by minor proportions, based on the mono alpha alkenyl arenes, of copolymerizable monomers that have conjugated double bonds, such as conjugated dienes, vinyl indenes, divinyl benzene and the like.

The B polymer blocks are made from conjugated dienes, typified by butadiene, isoprene, alkylbutadienes such as 2-methylbutadiene, methylpentadiene and the like.

Solution polymerization is preferred to make the precursor block copolymers using lithium based catalysts that may be monofunctional, for example, lithium alkyls, or polyfunctional, for example, dilithionaphthalene. The monomers are dissolved in inert solvents, such as alkanes, alkenes, cycloalkanes or cycloalkenes. After removing oxygen from the system by purging with nitrogen, impurities are scavenged out with carefully measured quantities of polymerization initiator, e.g., by adding a quantity of lithium alkyl almost to the point of initiating polymerization. More lithium alkyl is then added that is sufficient to case polymerization to a polymer block of appropriate molecular weight. A second monomer, and later a third monomer, if desired, is added to form subsequent polymer blocks, being careful in each instance that each monomer is consumed by polymerization, or that the excess is removed, before adding the next monomer.

In this way, a two-block polymer A–B may be formed and used as is, or coupled, or made into a three-block polymer with more monomer; all three types of precursor products are useful as starting materials for the present invention. The A—B—Li "living" polymer may be coupled to form a linear A—B—B—A structure with a dihaloethane, or it may be joined in a multiple way to form a star-shaped, radial, branched or non-linear structure (depending on the nomenclature desired) using a polyfunctional coupling agent such as silicon tetrahalide, diesters of dicarboxylic acids and monohydric alcohols like diethyl adipate, or other coupling agents known to the art.

The average molecular weight of each A polymer block in the configurations described above may be from about 2,000 to about 45,000, preferably 8,000 to about 30,000, while the B polymer block may have average molecular weights from about 35,000 to about 150,000, preferably 50,000 to 125,000, the proportion of A blocks being from about 5% to about 70% of the total average molecular weight of the block copolymer. The properties of the precursor block copolymers will therefore range from highly elastomeric, snappy rubbers at low A polymer block percentages to slow recovering elastomers or even products with plastic character at high A polymer block percentages.

Insertion of conjugated diene monomers into the diene polymer block occurs in several ways using the lithium based catalysts, preferably lithium alkyls, employed according to the prior art. Polymerization of butadiene leads to a mixture of several types of polymer microstructures, known as cis-1,4, trans-1,4 and 1,2 microstructures. In the cis-1,4 and trans-1,4 structures, carbon arrangement is all in a line and no small side chains are formed; thus, the double bonds produced are internal in the backbone chain. In the 1,2 microstructure, a two-carbon vinyl group is present as a short side chain directly attached to the two remaining carbon atoms of the original diene monomer unit. These two-carbon olefinic side chains are often known as pendant vinyl groups, since they seem to dangle from the main backbone chain. All three types of microstructures may be present in a diene polymer block, but conditions are known in the art to maximize or minimize any of the three types if so desired. The pendant vinyl groups react more vigorously than the cis/trans internal double bonds with carbon monoxide and hydrogen.

A fourth type of microstructure known as 3,4 structure is also formed when substituted conjugated diolefins are polymerized. This is the case when isoprene is used. The 3,4 microstructure reacts in the present invention in the same way as 1,2 microstructure, and statements about polymers having 1,2 structure in this application and claims also include polymers having 3,4 microstructure.

The polymerization process described above, using only hydrocarbon solvents, normally produces polymers having a low percentage of 1,2 microstructures in the polydiene middle block. Only polymers that have low 1,2 microstructure are suitable starting materials for the reductive hydroformylation process of the present invention; diene polymer blocks of moderate to high 1,2 microstructure, for example, 40–80% 1,2 content, react unfavorably and yield products that are poor elastomers, if elasticity is desired. The reaction products from polymers having 40% to 80% 1,2 microstructure tend to crosslink during recovery and processing to form insoluble, three dimensional polymers that do not have the properties of thermoplastic, self-vulcanizing polymers, but find application as resin and coating additives.

It is therefore important, when making precursor block copolymers for use in the present invention, to avoid the presence of polar substances such as ethers, sulfides, tertiary amines and other nucleophilic substances while the polydiene block is being produced, because these polar substances influence the mode of insertion of diene monomers into the polydiene block. Depending on the amounts of these polar substances that might be present, the percentage of 1,2 microstructure in the polydiene block formed may be as high as 80–90% of the total and such products would be unsuitable precursors for the present invention.

Another method of preparing precursor block copolymers of low 1,2 or 3,4 microstructure useful for this invention is to hydrogenate selectively the 1,2 microstructure in diene polymer blocks of the block copolymer described above. An activated nickel, cobalt, iron or rhodium catalyst, prepared by reducing the corresponding metal carboxylate or alkoxide with an aluminum alkyl compound, is employed with hydrogen at about 500–5000 p.s.i.g. to hydrogenate the block copolymer in an inert hydrocarbon solvent at about 20–175° C. This hydrogenation is complete in about 0.1–4 hours. Substantially all of the 1,2 microstructure, but only part, i.e., 0 to about 50%, of the 1,4 structured segments of the diene polymer block react with hydrogen. It is desirable that essentially no infrared absorbance be observed in the hydrogenated precursor polymer at either 10.05 or 10.98 microns, so that the substantial absence of 1,2 microstructure is assured. Similarly, the substantial absence of 3,4 microstructure in precursors having polymer blocks made from substituted dienes is determined by infrared spectometric procedures or nuclear magnetic resonance spectrometry. Under these hydrogenation conditions, the mono alpha alkenyl arene polymer blocks of the block copolymer do not react with hydrogen, so that they retain their aromatic double bonds.

The pre-hydrogenated block copolymers of this type have essentially no 1,2 microstructure, but have sufficient 1,4 structured olefinic double bonds to produce a desirable number of hydroxymethyl groups when reacted with carbon monoxide and hydrogen. The molecular weight of the diene polymer block must be carefully adjusted with respect to the molecular weight of the mono alpha alkenyl arene polymer blocks so that, after hydrogenation to remove 1,2 microstructure, the proper concentration of hydroxyl groups to yield needed solvent resistance and weatherability can be inserted by hydroformylating the remaining olefinic double bonds.

Hydroxylation of the precursor block copolymer is done in the process of this invention by reaction with carbon monoxide and hydrogen in the presence of a special type of hydroformylation catalyst. The procedure may be single stage, or may be a two-step process, if desired. The special hydrocarbon-soluble catalyst comprises essentially a metal ion selected from the group iron, nickel, cobalt and rhodium in complex bond with carbon monoxide and an organic compound of phosphorus, specifically, a trihydrocarbylphosphine.

This type of complex catalyst is characterized by unique physical and chemical characteristics comprising extreme stability at very low pressures of carbon monoxide-hydrogen mixtures under the conditions prevailing during hydroformylation, yet the catalyst remains stable even at relatively high hydroformylation temperatures. Most important is the fact that this type of catalyst permits the reaction to produce hydroxylated block polymers to be carried out in one step without necessarily requiring a second hydrogenation step. In contrast, the dicobalt carbonyl catalysts of the prior art have been found to decompose completely to cobalt metal and become ineffective under comparable hydroformylation conditions, and have been found even under optimum conditions to produce primarily carbonylic polymers that require later hydrogenation to obtain hydroxylated species.

Trihydrocarbylphosphines suitable for the special catalyst of this invention may be trialkylphosphines, exemplified by trimethylphosphine, triethylphosphine and the like, or mixed alkylarylphosphines, exemplified by methyldiphenylphosphine, ethylpropylphenylphosphine, dioctylphenylphosphine, methylcyclohexylphenylphosphine, 1,6-bis(diphenylphosphino)hexane and the like.

A preferred group of suitable trihydrocarbylphosphines are those wherein two, or all three, of the alkyl groups are joined by carbon to carbon linkage to form trialkylphosphines or aryldialkylphosphines of cyclic structure. Examples of this subclass, and particularly preferred compounds for formation of the special catalyst of this invention, are 9-phenyl-9-phospha-(3.3.1)-bicyclononane and 9-eicosyl-9-phospha-(3.3.1)-bicyclononane.

A catalyst suitable for the hydroformylation of the block copolymers described in the present invention may be prepared by slurrying cobalt octacarbonyl with a suitable trihydrocarbylphosphine in hexane in an autoclave and heating at 80° C. for 40 minutes under 500 p.s.i.g. of synthesis gas pressure (carbon monoxide-hydrogen mixture). The product is prepared directly in the reaction vessel to be used for hydroformylation of the block copolymer. Alternatively, a solution of cobalt octacarbonyl and, for example, 9-phenyl-9-phospha-(3.3.1)-bicyclononane may be prepared in a hydrocarbon liquid such as cyclohexane or in an oxygenated solvent such as dioxane, and heated to about 100° C. for 0.25 to 3 hours in a hydrogen carbon monoxide (2 to 1) atmosphere before adding a hydrocarbon solution of the block copolymer to be hydroformylated.

Selection of the appropriate catalyst and reaction conditions is all-important to achieving the objectives of this invention. Installation of hydroxyl groups to a moderate extent, for example, reacting less than of the order of 50% of the olefinic double bonds in the middle block with carbon monoxide and hydrogen to form hydroxymethyl groups, while avoiding severe polymer degradation, is important in order to obtain a product having good physical properties and weather resistance together with a desirable set of resistances to various solvents.

The reaction with carbon monoxide and hydrogen is conducted in a pressure vessel preferably as a one step process. The catalyst is prepared first as described above, then a solution of the precursor polymer in inert solvent, for example, cyclohexane, containing an ether such as dioxane is pumped in. Hydrogen and carbon monoxide in molar ratios of about 1 to 1 to about 5–1 (preferably between 1.5 to 1 and 3 to 1) are added until a pressure from about 500 to about 1500 p.s.i.g., preferably 800–1200 p.s.i.g., is reached. Temperatures may be from about 150° C. to about 225° C., preferably 180–205° C. Reaction should be continued for 1 to 10 hours, though periods of 2–5 hours are usually preferred.

The concentration of precursor block copolymer in the reacting solution should be kept below about 10%, and preferably below 5%, in order to minimize intermolecular side reactions that cause gel formation during hydroformylation. There is evidence that lactone formation occurs and that ester and ketone groups are formed in this reaction. If such formation connects two molecules by an intermolecular process, molecular size is doubled, and if enough intermolecular reactions occur, very large molecules are formed that cause gelation.

The higher the concentration of reactive, oxygen-containing groups, as signalled by larger oxygen contents in the polymer, the greater is the opportunity for reactions between molecules leading to undesirable gel formation and insolubility. Prevention of such three-dimensional molecules is another reason for limiting polymer oxygen content to less than about 6–8% oxygen content.

Control of the hydroformylation reaction is obtained by judicious selection among several variables. Reaction rate (oxygen content vs. time) is directly related to catalyst concentration at constant temperature and pressure. Both temperature and pressure can be varied to compensate for reduced catalyst concentration. The hydrogen to carbon monoxide ratio also affects rate; higher ratios in the reacting gas generally increase reaction rate and, of course, the oxygen content of the polymer.

It is preferred to conduct the hydroformylation as a one step process, but a two-stage process may be used, if desired. In a two-step process the reaction of carbon monoxide and hydrogen with the block copolymer may be conducted under less drastic conditions, that is, lower temperatures and pressures, then the hydrogenation may be done under more drastic conditions. After the initial reaction of the block copolymer with carbon monoxide and hydrogen to form carbonyl groups, the mol fraction of carbon monoxide to hydrogen may be drastically diminished and reaction may be continued in a hydrogen-rich environment until the carbonyl groups are substantially all converted to primary alcohol groups and the remaining olefinic double bonds in the polydiene block are substantially hydrogenated to the saturated hydrocarbon structure. The hydrogen to carbon monoxide ratio, may be from about 20:1 to about 5:1, but is preferably from about 10:1 to about 20:1 in the hydrogenation stage, and the temperature may be increased by 20–40° C.

The same catalyst is used for both stages of the process. It is uneconomic and it is not necessary to apply the complex process of recovering the intermediate polymer in order to hydrogenate it in a separate step with a special hydrogenation catalyst, although such a process may be used if desired.

The product from the reductive hydroformylation reaction is a block copolymer containing hydroxymethyl polar groups located on about 50% of the former olefinic double bonds in the precursor polymer; the rest of these bonds have been hydrogenated. Depending on the characteristics of the presursor polymer, the hydroxylated product will be elastomeric or almost plastic in character. The properties depend not only on the weight ratio of mono alpha alkenyl arene polymer block to hydroxylated polydiene block, but also on the extent of hydroxylation of the polydiene block. If the content of mono alpha alkenyl arene polymer block is high in the final product and the former polydiene polymer block is highly hydroxylated, the final product is a plastic because both of these types of polymer blocks have glass transition temperatures of 25° C. or higher. Elastomeric products require that the glass transition temperature of the middle (interior) polymer blocks be below about $-20°$ C. in order to achieve commercial acceptance. Therefore, as noted hereinbefore, the characteristics of the product must be controlled by careful selection of polymer structure to achieve a suitable combination of glass transition temperatures.

The solvent resistance and weatherability of the product are also controlled by the extent of hydroxylation and by the ratio of mono alpha alkenyl arene polymer block to hydroxylated polydiene block. For example, before reductive hydroformylation, a 15,000–162,000–17,000 molecular weight polystyrene - polybutadiene - polystyrene block copolymer having 31% polystyrene content and 18%, 1,2 microstructure in the middle block was completely soluble in toluene and swollen badly by iso-octane after immersion for 16–24 hours at 23° C. After hydroformylation to produce 8% w. oxygen content in the total polymer, the product was relatively resistant to solution in these two solvents; the swelling ratio, i.e., ratio of test specimen volume after and before swelling, was only 1.3 in iso-octane and 13 in toluene. A product made from the same precursor polymer, but hydroformylated to only 2% oxygen, was more elastomeric but was affected more by toluene and iso-octane than the product of higher oxygen content. When a 10,000–31,000–9,000 molecular weight polystyrene-polybutadiene-polystyrene block copolymer having 38% polystyrene content and 10% 1,2 content in the polybutadiene block was hydroxylated to 3.1% oxygen by reductive hydroformylation, it had plastic properties because of the relatively high content of polystyrene block and hydroxylated middle block.

When exposed to a combination of ultraviolet light and moisture in a laboratory Weather-O-Meter, the hydroxylated block copolymers of this invention showed improved resistance to weathering. They had no visible cracks after 100 hours of exposure, in contrast to cracks and brittleness in the precursor polymers after similar exposure.

The products of this invention are useful in themselves because they have high strength and they can be repeatedly molded and cooled without substantial loss of properties. Because they have multiple active primary alcohol groups, they may be utilized for semipermeable membranes in such uses as water purification or may serve in compositions suitable for human body implants. Also the products of this invention may be reacted via their alcohol groups with other molecules such as urethanes, epoxides, acids, anhydrides, siloxanes and the like to form polymeric structures of completely different properties that may be components of resins, plastics and coating compositions.

The following examples are presented in order to illustrate the manner in which the invention may be carried out. It is to be understood, however, that the examples are for the purpose of illustration and that the invention is not to be regarded as limited to any of the specific conditions or reactants recited therein.

EXAMPLE I

A magnetically stirred autoclave was charged with 0.244 g. of cobalt octacarbonyl in 100 ml. of cyclohexane and 1.73 millimoles of 9-eicosyl-9-phospha-(3.3.1)-bicyclononane. The solution was heated to 80° C. for 0.5 hour under 500 p.s.i.g. total pressure of a 2:1 molar mixture of hydrogen and carbon monoxide. An additional 96 g. of cyclohexane and 232 g. of block copolymer solution were then added. The block copolymer solution in cyclohexane contained 7.1% of a polystyrene-polybutadiene-polystyrene block copolymer having average block molecular weights of 15,000–162,000–17,000 and having 18% 1,2 microstructure in the middle block. The pressure of the 2:1 hydrogen-carbon monoxide mixture was increased to 1100 p.s.i.g., and the temperature was maintained at 192–195° C. for 7 hours. After the pressure was released, the solution was acidified with 5% w. hydrochloric acid in isopropanol and was then diluted with dioxane. The cobalt salts were removed chromatographically before coagulation with methanol.

Since the original block copolymer contained about 80% 1,4 microstructure and about 18% 1,2 microstructure in the polybutadiene block, the disappearance of 95% of the original 1,2 type structure corresponds to 3.4% oxygen in the polymer. This is in reasonable agreement with the 2.8% oxygen found in the polymer by analysis, and is also an indication that there is some competing hydrogenation of the polymer under these conditions.

EXAMPLE II

A polystyrene-polybutadiene-polystyrene block copolymer having 38% 1,2 microstructure in the polybutadiene block was made, then was selectively hydrogenated to remove all of the 1,2 microstructure but only part of the 1,4 microstructure. It was then reacted with carbon monoxide and hydrogen in a two-stage reaction.

Polymerization

All monomers and solvents were treated to remove water, oxygen and polar materials and the reaction system was thoroughly purged and blanketed with nitrogen. The reactor was charged with 4200 g. cyclohexane and 468 g. styrene that had been titrated with secondary butyl lithium to scavenge impurities. Then 0.031 mole of secondary butyl lithium in 275 g. cyclohexane was added to start polymerization, which converted essentially all of the styrene in one hour at 50° C. A 130 g. sample was withdrawn for analysis.

The rest of the living polymer solution was transferred to a second reactor containing 2160 g. of butadiene, 11,535 g. of cyclohexane and 50 g. of tetrahydrofurane (tetrahydrofurane:lithium ratio, 20:1) that had been pretitrated with secondary butyl lithium to the point of incipient polymerization. After 3 hours further polymerization at 40° C., the butadiene was substantially all consumed to form the second block of the copolymer. A second sample was removed for analysis.

A solution of 442 g. of styrene in 2650 g. of cyclohexane, pretitrated with secondary butyl lithium to incipient polymerization, was then charged to the reactor to form the third block of this polymer. After one hour at 45° C. polymerization was complete. A third sample was removed for analysis, and the remainder of the polymer solution was hydrogenated.

Analysis of the three samples removed during polymerization by a tritium method indicated that the average molecular weights of the three blocks were 15,000–68,000–14,000. The polybutadiene middle block of this polymer contained 38% 1,2 microstructure, using an infrared analysis based on the absorbances at wave lengths of 10.05 and 10.98 microns.

Selective hydrogenation

The polymer solution from the polymerization step was transferred to a hydrogenation autoclave. As catalyst 6 moles of nickel acetylacetonate was reacted with 12 moles of triethyl aluminum in 1500 ml. cyclohexane for 15 minutes at 25° C., then added to the autoclave. The autoclave was pressured to 500 p.s.i.g. with hydrogen; temperature rose to 50° C. and after 25 minutes, hydrogenation was stopped. The selectively hydrogenated polymer had an iodine number of 92 and had substantially no 1,2 microstructore remaining in the polybutadiene middle block, but a substantial percentage of the cis and trans 1,4 unsaturation remained. The polystyrene terminal blocks of the block copolymer were not hydrogenated. This product was an elastomeric block copolymer that did not require vulcanization to achieve strength.

Reductive hydroformylation

The selectively hydrogenated polymer having essentially no 1,2 microstructure was reacted with carbon monoxide and hydrogen in the two-stage procedure.

A catalyst system was prepared containing 0.244 g. cobalt octacarbonyl and 0.311 g. of 9-phenyl-9-phospha-(3.3.1)-bicyclononane in a mixture of 200 g. of isopropanol and 150 g. of cyclohexane. This solution was heated at 80° C. for 0.5 hour under 500 p.s.i.g. total pressure of hydrogen and carbon monoxide (2:1 molar ratio). To this solution, 115 g. of a 22% w. solution of the selectively hydrogenated block copolymer in cyclohexane was added. Pressure was increased to 1100 p.s.i.g. with additional hydrogen and carbon monoxide (2:1 molar ratio) and temperature was raised to 150° C. for 4 hours. Then the pressure was reduced to 200 p.s.i.g. before hydrogen was admitted to produce a total pressure of 1200 p.s.i.g., which was maintained for 3 hours at 190° C. The product solution was worked up as in Example I. The finished polymer was a typical thermoplastic elastomer that did not require vulcanization to achieve good tensile strength. The polymer had an oxygen content of 1.5% w. Swelling ratio (ratio of sample volumes after and before immersion for 16 hours) in isooctane at room temperature was 2.5, compared to a swelling ratio of 11 for a block copolymer made from the same precursor copolymer by drastic hydrogenation, showing that the installation of relatively few —CH₂OH groups improved hydrocarbon solvent resistance.

In a separate experiment with the same polymer, reaction conditions were adjusted slightly so that the final polymeric product contained 2.5% oxygen. This product swelled even less in isooctane; the swelling ratio was only 1.9.

Comparative tensile strength data, obtained by rubber testing methods, was

|  | Before treatment with CO + H₂ | After treatment with CO + H₂ | |
|---|---|---|---|
|  |  | 1.5 [1] | 2.5 [1] |
| Tensile strength, 23° C., p.s.i. | 6,775 | 4,700 | 3,300 |
| 300% modulus, 23° C., p.s.i. | 625 | 1,000 | 1,200 |
| Elongation at break, 23° C., percent | 540 | 440 | 500 |
| Set after break, 23° C., percent | 30 | 20 | 30 |

[1] Percent oxygen content.

The results show that introduction of hydroxymethyl groups by the process described does not degrade the selectively hydrogenated block copolymer, but increases modulus (stiffness), as would be expected from the introduction of polar groups.

EXAMPLE III

This example demonstrates that a much different type of product results if a block copolymer of 40% 1,2 microstructure is reductively hydroformylated without prior selective hydrogenation.

A solution of 0.05 g. of cobalt octacarbonyl and 0.562 g. of 9-phenyl-9-phospha-(3.3.1)-bicyclononane in 100 ml. of dioxane was heated to 100° C. under 50 p.s.i.g. pressure of hydrogen and carbon monoxide (molar ratio 2:1) for 40 minutes. To this solution 166 g. of a 15% cyclohexane solution of a polystyrene-polybutadiene-polystyrene block copolymer was added; this block copolymer had average block molecular weights of 30,000–140,000–30,000 and its middle block contained 41% 1,2 microstructure. The temperature was increased to 185–195° C. and the hydrogen-carbon monoxide (2:1) pressure was raised to 1100 p.s.i.g., and these conditions were held for 3 hours.

The block copolymer produced contained 6% w. oxygen because of the extensive hydroformylation of the high content of olefinic double bonds in the 1,2 microstructure. The product had plastic character, was crosslinked, and was, therefore, insoluble even in hot dioxane.

EXAMPLES IV AND V

The polystyrene-polybutadiene-polystyrene block copolymer described in Example I having block molecular weights of 15,000–162,000–17,000 and having 18% 1,2 microstructure was reductively hydroformylated in two separate experiments to produce products with 2% and 8% oxygen content, respectively. Both products were elastomeric and neither product was crosslinked or insoluble because of gel, in contrast to the crosslinked product from the block copolymer of 42% 1,2 microstructure hydroformylated in Example III. These experiments clearly indicate that the content of 1,2 microstructure is highly important, and that low 1,2 content must be present in the precursor polymer before hydroformylation.

We claim as our invention:

1. A method for preparing a hydroxylated polymer comprising reacting in an inert solvent a block copolymer having at least one mono alpha alkenyl arene polymer block having an average molecular weight between about 2,000 and 45,000 and at least one conjugated diene polymer block having an average molecular weight between about 35,000 and 150,000 wherein the 1,2 or 3,4 microstructure is between 0% and about 30%, the balance being 1,4-structured, with hydrogen and carbon monoxide in molar ratio between about 1 to 1 and about 5 to 1 at temperature of about 150° C. to about 225° C. and at a pressure of about 550 p.s.i.g. to about 1500 p.s.i.g. for 1 to 10 hours in the presence of a catalyst consisting essentially of a transition metal selected from the group iron, nickel, cobalt and rhodium in complex combination with carbon monoxide and a trihydrocarbylphosphine until 10–100% of the unsaturation in the diene polymer block has been replaced with CH₂OH groups and 90%–0% of the unsaturation has been saturated with hydrogen.

2. The method of claim 1 in which the block copolymer, prior to reaction with carbon monoxide and hydrogen, is selected from a group having the structures A—B—(A)₀₋₁, A—(B—A)₂₋₅ and A—B—(B—A)₂₋₅ wherein A is a mono alpha alkenyl arene polymer block and B is a diene polymer block.

3. The method of claim 1 wherein the precursor block copolymer contains polymer blocks made from styrene and butadiene.

4. A hydroxylated block copolymer obtained by the process of claim 1.

5. A hydroxylated block copolymer according to claim 4 having a structure, prior to reaction with carbon monoxide and hydrogen, of

A—B wherein A is a mono alpha alkenyl arene polymer block and B is a diene polymer block.

6. A hydroxylated block copolymer according to claim 4 having a structure, prior to reaction with carbon monoxide and hydrogen, of

A—B—A wherein A is a mono alpha alkenyl arene polymer block and B is a diene polymer block.

7. A hydroxylated block copolymer according to claim 4 having a structure, prior to reaction with carbon monoxide and hydrogen of

A—B—(B—A)₁₋₅ wherein A is a mono alpha alkenyl arene polymer block and B is a diene polymer block.

8. A hydroxylated block copolymer according to claim 7 wherein each A is a poly(alpha methyl styrene) block.

9. A hydroxylated block copolymer according to claim 4 wherein the structure, prior to reaction with carbon monoxide and hydrogen, is polystyrene-polybutadiene-polystyrene.

10. A method for preparing a hydroxylated polymer comprising reacting in an inert solvent a selectively hydrogenated block copolymer having, prior to selective hydrogenation, at least one mono alpha alkenyl arene polymer block having an average molecular weight between about 2,000 and 45,000 and at least one conjugated diene polymer block having an average molecular weight between 35,000 and 150,000 wherein the conjugated diene polymer block has between 20% and about 60% 1,2 or 3,4 microstructure, the balance being 1,4 structured, said block copolymer being selectively hydrogenated to remove substantially all of the unsaturation in the 1,2 microstructure and no more than 50% of the unsaturation in the 1,4 microstructure, with hydrogen and carbon monoxide in molar ratio between 1 to 1 and about 5 to 1 at a temperature of about 150° C. to about 225° C. and at a pressure of about 500 p.s.i.g. to about 1500 p.s.i.g. for 1 to 10 hours in the presence of a catalyst consisting essentially of a transition metal selected from the group iron, nickel, cobalt and rhodium complex combination with carbon monoxide and a trihydrocarbylphosphine until 10–100% of the unsaturation in the diene polymer block has been replaced with CH₂OH groups and 90%–0% of the unsaturation has been saturated with hydrogen.

11. The method of claim 10 in which the block copolymer, prior to selective hydrogenation and prior to reaction with carbon monoxide and hydrogen, is selected from a group having the structures A—B—(A)₀₋₁, A—(B—A)₂₋₅ and A—B—(B—A)₂₋₅ wherein A is a mono alpha alkenyl arene polymer block and B is a diene polymer block.

12. The method of claim 10 wherein the precursor block polymer, prior to selective hydrogenation, contains polymer blocks made from styrene and butadiene.

13. A hydroxylated block copolymer obtained by the process of claim 10.

14. A hydroxylated block copolymer according to claim 13 having the structure, prior to reaction with carbon monoxide and hydrogen and prior to selective hydrogenation of $$A-B$$

wherein A is a mono alpha alkenyl arene polymer block and B is a diene polymer block.

15. A hydroxylated block copolymer according to claim 13 having the structure, prior to reaction with carbon monoxide and hydrogen and prior to selective hydrogenation of $$A-B(B-A)_{1-5}$$

wherein each A is a mono alpha alkenyl arene polymer block and B is a diene polymer block.

16. A hydroxylated block copolymer according to claim 15 in which each A is an alpha methyl styrene polymer block and each B is a diene polymer block.

References Cited
UNITED STATES PATENTS

| | | | |
|---|---|---|---|
| 3,334,076 | 8/1967 | Mertzweiller | 260—94.7 |
| 3,431,323 | 3/1969 | Jones | 260—880 |
| 3,555,112 | 1/1971 | Winkler | 260—876 |

JAMES A. SEIDLECK, Primary Examiner

U.S. Cl. X.R.

260—94.7 H, 94.7 A, 96 R, 879